United States Patent
Kitayama et al.

[11] Patent Number: 5,916,656
[45] Date of Patent: *Jun. 29, 1999

[54] SHEET GLASS FLATTENING METHOD, METHOD OF MANUFACTURING AN INFORMATION RECORDING GLASS SUBSTRATE USING FLATTENED GLASS, METHOD OF MANUFACTURING A MAGNETIC DISK USING GLASS SUBSTRATE, AND MAGNETIC RECORDING MEDIUM

[75] Inventors: Teruki Kitayama, Oume; Kazuhiko Sekiguchi, Akishima; Teruhisa Fujita; Yoshio Murano, both of Akigawa; Sakuji Yoshihara, Mizuho-machi; Tak Kojima, Yamanashi-Ken, all of Japan

[73] Assignee: Hoya Corporation, Japan

[*] Notice: This patent is subject to a terminal disclaimer.

[21] Appl. No.: 08/905,640

[22] Filed: Aug. 4, 1997

Related U.S. Application Data

[63] Continuation of application No. 08/579,319, Dec. 27, 1995, Pat. No. 5,654,057.

[30] Foreign Application Priority Data

| Dec. 28, 1994 | [JP] | Japan | 6-339069 |
| Jul. 4, 1995 | [JP] | Japan | 7-191259 |
| Oct. 31, 1995 | [JP] | Japan | 7-306822 |
| Oct. 31, 1995 | [JP] | Japan | 7-306823 |

[51] Int. Cl.⁶ ............................ B32B 3/00; C03C 15/00
[52] U.S. Cl. ................ 428/64.1; 428/410; 428/426; 430/270.11; 65/30.13; 65/30.14; 65/117; 369/288
[58] Field of Search ................. 428/64.1, 64.2, 428/64.4, 410, 426, 913; 65/30.13, 30.14, 117; 430/270.1, 290.11, 945; 369/288

[56] References Cited

U.S. PATENT DOCUMENTS 5,654,057  8/1997  Kitayama et al. .................. 428/64.1

Primary Examiner—Elizabeth Evans
Attorney, Agent, or Firm—Edward D. Manzo; Mark J. Murphy

[57] ABSTRACT

A glass substrate manufacturing method advantageously applicable to magnetic recording disk glass substrates, LCD glass substrates, photomasks glass substrates, or optical memory glass substrates. The method includes the steps of forming a film of a solution on at least a principal surface of a sheet glass formed using a down-drawing method, the solution containing a water soluble inorganic material and a surface-active agent; sandwiching both sides of a single sheet glass on which the film is formed or of a laminated structure of two or more sheet glasses with a densified sheet with a high flatness to pressure the single glass or laminated structure; and heating and annealing the single sheet glass or laminated structure to flatten the same. The end side of the flatten glass substrate is treated with a treating solution containing a hydrofluosilicic acid. The glass substrate is formed by chemically strengthening a glass substrate by immersing the glass substrate in a heated chemical reinforcement solution and then ion exchanging ions on the surface layer of the glass substrate with ions in the chemical reinforcement solution; removing the substrate form the chemical reinforcement solution and then annealing it to a temperature higher than the crystallization temperature of a molten salt; annealing the glass substrate at a rate at which the crystallization of the molten salt is deposited on the surface of the glass substrate; and then cleaning the surface of the glass substrate. Moreover, the glass substrate may be formed by chemically strengthening a glass substrate by immersing the glass substrate in a heated chemical reinforcement solution and then ion exchanging ions on the surface layer of the glass substrate with ions in the chemical reinforcement solution; and removing the substrate from the chemical reinforcement solution and then cleaning the surface of the glass substrate with a cleaning agent containing acid.

7 Claims, 2 Drawing Sheets

FIG. 4
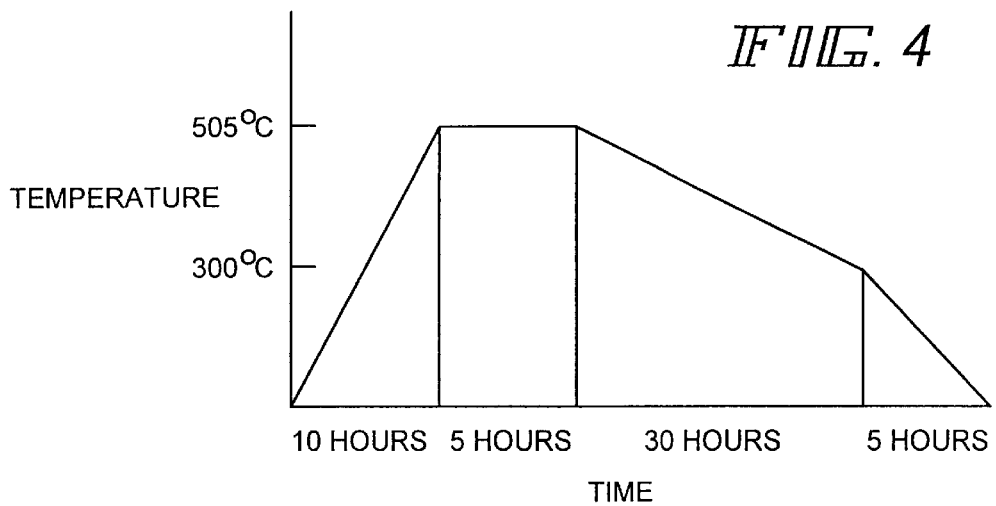
FIG. 5
|  | BEFORE ANNEALING | AFTER ANNEALING |
|---|---|---|
| DATUM LENGTH a (mm) | 300 | 70 |
| WARPAGE AND DEFLECTION AMOUNT b (mm) | 0.3 ~ 1.5 | 0.02 ~ 0.03 |
| WARPAGE AND DEFLECTION RATE (b/a)(%) | 0.1 ~ 0.5 | 0.028 ~ 0.042 |
FIG. 6
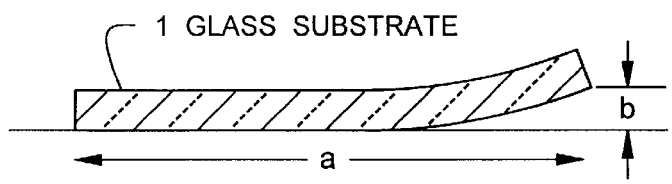

SHEET GLASS FLATTENING METHOD, METHOD OF MANUFACTURING AN INFORMATION RECORDING GLASS SUBSTRATE USING FLATTENED GLASS, METHOD OF MANUFACTURING A MAGNETIC DISK USING GLASS SUBSTRATE, AND MAGNETIC RECORDING MEDIUM

This is a continuation of application Ser. No. 08/579,319, filed Dec. 27, 1995 now U.S. Pat. No. 5,654,057 issued Aug. 5, 1997.

REFERENCE TO RELATED APPLICATION

This application claims priority under 35 U.S.C. 119, of Japanese Patent Application No. Hei 06-339069 filed on Dec. 28, 1994, No. Hei 07-191259 filed on Jul. 7, 1995, No. Hei 07-306822 filed on Oct. 31, 1995, and No. Hei 07-306823 filed on Oct. 31, 1995, the entire disclosure of which is incorporated herein by reference.

BACKGROUND OF THE INVENTION

1. Field of the Invention

The present invention relates to a sheet glass flattening method, a method of manufacturing products using a glass substrate produced using the flattening method, and the products themselves. More particularly, the present invention relates to a method of a manufacturing glass substrate for an information recording disk used for hard disks, optical recording medium, and similar things, and a glass substrate technique applicable advantageously to magnetic recording disks and the like manufactured by the above mentioned manufacturing method.

2. Description of the Related Art

Conventionally, thin glass substrates have been used for magnetic recording disks (hard disks), optical disks, liquid crystal displays, and the like. Recently, glass substrates have become popular because they have excellent characteristics such as higher flatness and sheet thinning capability, compared with other resin substrates and metal substrates.

Usually, the thin glass substrate is prepared by processing a sheet glass blank, obtained by fabrication through a method such as the down-drawing method (fusion method) or floating method, to a predetermined dimension and then abrading the surface of the result.

The down-drawing method is generally a method of manufacturing sheet glass by drawing down molten glass and then pulling down vertically the same. For example, the method can be done by having molten glass run down along the front and back surfaces of a molding body with a wedged cross section and then joined at the lower portion of the molding body in a sheet form. The sheet is then cooled and solidified by pulling down upon it with a pulling roller to produce sheet glass (see Japanese Unexamined Patent publication (Tokkai-Hei) No. 5-163032 or U.S. Pat. No. 3,338, 696).

A sheet glass produced by the down-drawing method is thinner than that produced by other methods and can be used as a thin glass substrate for magnetic recording disks and for liquid crystal displays. However, because of the characteristics of this forming method, the flatness of the sheet is degraded compared with the sheet glass produced by the floating method. For that reason, where thin film glass produced by the down-drawing method is used for the above-mentioned applications, a heat treatment (heating and annealing) is needed to correct and improve the flatness of the sheet glass.

In the method, as shown in FIGS. 1(a) and 1(b), the heating and annealing are carried out with thin glass substrates 11 sandwiched between cut and polished densified sheets (thick, flat correcting aluminum sheets) 10 with a paper or carbon paper 12 acting as a lubricant inserted between either surface of the thin glass substrates 11 laminated and the densified sheet 10. Numeral 13 represents a fin for preventing the densified sheet from being deformed.

With plural thin glass sheets laminated to increase efficiency, and when the heat treatment is done without any consideration, the plural glass sheets are thermally bonded together, and completely damaged. Hence, it is necessary to prevent the thin glass sheets from becoming bonded together. To overcome this problem, one method inserts a paper or carbon paper between the thin glass sheets and utilizes paper cinders, or carbon paper as a lubricant (see Japanese Unexamined Patent Publication (Tokkai-hei) No. 6-247730).

Where paper is sandwiched between the thin glass sheets, as the number of laminated thin glass layers increases, the accuracy of the flatness cannot be accomplished to a desired value because of the paper's thickness and elasticity. Labor is also needed in handling and cleaning the cinders. In more detail, in the paper sandwiched between the thin glass sheets, the paper's peripheral portion is burnt out, but its center portion remains carbonized due to oxygen shortage so that there is a difference in thickness between the peripheral portion and the center portion of the thin glass sheet. The thickness is increased by the laminated value, and the flatness becomes poor due to the increased thickness transferred onto the thin glass sheet. This results in insufficient satisfaction to a required accuracy. Moreover, when the thin sheet glass is taken out of a heating furnace after the thermal treatment, paper cinders may be scattered around, thus degenerating the working environment. Thus, the handling is troublesome. Moreover, a tar component from the paper adhered on the surface of the thin glass sheet is troublesome and causes additional cleaning labor.

Where a carbon paper is sandwiched between the thin glass sheets, the thickness and elasticity of the carbon paper make it difficult to set the accuracy of flatness to a desired value. Further, the costly carbon paper causes an increase in cost. In more detail, since the carbon paper is 0.5 mm or more thicker than paper, the elasticity absorbs the flatness of the sheet glass. As a result, the insufficient correction of the flatness causes the improved flatness accuracy. The carbon paper also leads to higher costs because of its insufficient strength and its brittleness.

In order to avoid the above-mentioned problems, fine powders of an inorganic material may be used as the lubricant. However, it is difficult to uniformly scatter (coat) the fine powders over the surface of a thin glass sheet, and the fine powders end up being scattered, thus degenerating the working environment. Moreover, since the fine powders fuse on the surface of a thin glass sheet or hurt the surface thereof, they deteriorate the abrasion property of the thin glass sheet to an unusable state.

In addition, when paper or carbon paper is inserted between the thin glass sheets, dusts in air are involved. This causes flaws due to rubbing, thus resulting in a decrease in yield.

Because of such problems, it has been difficult to treat efficiently and thermally the laminated plural thin glass sheets with the flatness of a required accuracy, without producing flaws and foreign matter bonding.

For that reason, either at cost of the efficiency, a heat treatment is performed with the thin glass sheets respectively sandwiched between densified sheets with good flatness to secure the flatness of a required accuracy, or at the cost of the accuracy, a heat treatment is performed with paper or carbon paper sandwiched between thin glass sheets. Hence, the cinders are troublesome while cleaning is unavoidable.

In the conventional sheet glass flattening method, it has also been difficult preventing the laminated thin glass sheets from being bonded. In this method, it is difficult to obtain the flatness, with a required accuracy by treating efficiently and thermally the laminated plural thin glass sheets, without producing flaws and foreign matter bonding.

One problem is that a conventional glass substrate is costly because either the flatness with an accuracy required at the cost of efficiency must be secured, or a thin glass sheet prepared at the cost of the accuracy requires considerable polishing to secure the flatness of required accuracy.

Previously, aluminum substrates have been used as the substrate for magnetic recording disks. However, with the demands for small size, thin magnetic recording disks and low-floating of a magnetic head, glass substrates are being used at an increasing rate because small-sizing and thinning, high flatness, and low floating over a magnetic recording disk are more easily realized with the glass substrates as compared with the aluminum substrates.

However, a magnetic recording disk glass substrate of that kind is costly, and the surface condition of the substrate is poor because flaws unremovable in the polishing step and foreign matter boding are left on the substrate. Hence, there has been a problem in that a head crush occurs when the substrate is used for a magnetic recording disk, or defects occur in a film such as a magnetic layer, thus causing an error.

Where a glass substrate is used as a magnetic recording disk substrate, the surface of the glass substrate is generally subjected to a chemical strengthening process by a low-temperature ion exchanging method to improve the shock resistance and vibration resistance.

This chemical strengthening is make after cutting and polishing the glass substrate. There is also a substrate cleaning step prior to the chemical reinforcement process. This cleaning step is carried out with pure water, as described in Japanese Unexamined Patent Publication (Tokkai-Hei) No. 2-285508.

Conventionally, the polishing is made to the front and back surfaces of a glass substrate, but is not made to the outer peripheral end surface and inner peripheral end surface. Since these ends have rough surfaces, dusts may occur from the ends when unintentionally rubbed when the glass substrate is carried, or stored in or taken out of a housing case.

Recently, the slight dusting caused problems with the high density magnetic recording disks.

It is, however, possible to polish the end surfaces. Unfortunately, this leads to a high cost because it is difficult to polish the end surface to the surface roughness with which dusting can be prevented. It is also possible to polish by chemically etching the ends. However, the strong etching effect may make it difficult to obtain end surfaces with good surface roughness. Particularly, in the case of the glass substrate used for magnetic recording disks, the roundness is impaired through the etching process so that the center deviation results in rejected products. The strong etching effect may even reversely deteriorate the surface roughness of the end surface.

As stated supra, where the glass substrate is used as a magnetic recording disk substrate, the surface of the glass substrate is generally subjected to a chemical strengthening process.

The method disclosed in Japanese Unexamined Patent Publication (Tokkai-Hei) No. 5-32431 is a known method of manufacturing a magnetic recording disk using that kind of chemical reinforced glass substrate. According to the method described in the publication, the glass substrate is reinforced by immersing it into a mixed solution of potassium nitrate and sodium nitrate at 400 C., and an underlayer and a magnetic layer are successively formed on the chemical reinforced glass substrate.

However, as described in the conventional method, in the magnetic recording disk, which is manufactured by pulling up a glass substrate from the chemical reinforcement solution, cleaning it, and then successively forming an underlayer and a magnetic layer on the glass substrate, there is a disadvantage in that abnormal protrusions sometimes occur on the surface of the magnetic recording disk. As described above, the abnormal protrusions formed on the surface of a magnetic recording disk may cause a head crush to a magnetic head so that the magnetic recording disk cannot be used as a product.

Since molten salt adheres to the glass substrate after the chemical strengthening process, cleaning is required. Conventionally, Japanese Unexamined Patent Publication (Tokkai-Hei) No. 2-285508, for example, discloses a magnetic recording disk glass substrate after the chemical reinforcement process is cleaned using alkaline cleaning agent, pure water, and organic cleaning agent.

With the high recording density of a magnetic recording disk, it has been required to decrease the distance (spacing) between the magnetic recording disk and the magnetic head. Hence, the current problem is to remove completely the foreign matters on a glass substrate causing protrusions formed on the surface of a magnetic recording disk.

However, the above-described conventional cleaning method can provide a cleaning effect to some extent. It has been, however, difficult to completely remove the molten salt left on the glass substrate even if the glass substrate is cleaned after being pulled up from the chemical reinforcement solution.

SUMMARY OF THE INVENTION

In order to overcome the above mentioned problems, the first object of the present invention is to provide a method of flattening sheet glass wherein the thermal bonding between laminate thin sheet glass films can be prevented while plural laminated sheets of thin glass can be thermally treated effectively with a required accuracy of flatness without occurring any flaw and forcing matter welding.

A second object of the present invention is to provide a thin sheet glass substrate with high flatness a low price.

A third object of the present invention is to provide a magnetic recording medium which does not cause any head crush and has a defect-free film or magnetic layer.

A fourth object of the present invention is to provide a method of manufacturing a glass substrate for an information recording disk which can prevent the glass end surface from dusting, without impairing the roundness or deteriorating the surface roughness at the end surface.

A fifth object of the present invention is to provide a method of manufacturing a magnetic recording disk which can be designed so as to remove a defect due to dust from the glass end, to improve the product quality, and to reduce a defect occurrence during use of a product.

A sixth object of the present invention is to provide a method of manufacturing an information glass substrate with no abnormal protrusions and a method of manufacturing a magnetic recording disk with no abnormal protrusions.

A seventh object of the present invention is to provide a glass substrate for an information recording disk manufacturing method and a magnetic recording disk manufacturing method each of which can remove effectively deposited molten salt without damaging the glass substrate.

According to the present invention, a sheet glass flattening method comprises the steps of forming a film of a solution on at least a principal surface of a sheet glass formed using a down-drawing method, the solution containing a water soluble inorganic material and a surface-active agent; sandwiching both sides of a single sheet glass on which the film is formed, or of a laminated structure of plural sheet glasses, with a densified sheet with a high flatness to pressure the single glass or laminated structure; and heating and annealing the single sheet glass or laminated structure to flatten the same.

A manufacturing method for glass substrate for an information recording disk comprises the step of treating at least the end side of the glass substrate with a treating solution containing a hydrofluosilicic acid.

A magnetic recording disk manufacturing method comprises the step of applying the manufacturing method of treating at last the end side of the glass substrate with a treating solution containing hydrofluosilicic acid to a disk-like glass substrate; and then forming at least a magnetic layer on the glass substrate for an information recording disk.

A magnetic recording disk manufacturing method comprises the step of sand-blasting and polishing at least a disklike glass substrate; then treating the whole glass substrate with a treating solution containing a hydrofluosilicic acid; and then forming at least a magnetic layer on the glass substrate for an information recording disk.

A manufacturing method for a glass substrate for an information recording disk comprises the step of chemically strengthening a glass substrate by immersing the glass substrate in a chemical reinforcement solution heated and then ion exchanging ions on the surface layer of the glass substrate with ions in the chemical reinforcement solution; pulling up the substrate from the chemical reinforcement solution and then annealing it to a temperature higher than the crystallization temperature of a molten salt; annealing the glass substrate at a rate at which the crystallization of the molten salt is deposited on the surface of the glass substrate; and then cleaning the surface of the glass substrate.

A magnetic recording disk manufacturing method comprises the steps of chemically strengthening a glass substrate by immersing the glass substrate in a chemical reinforcement solution heated and then ion exchanging ions on the surface layer of the glass substrate with ions in the chemical reinforcement solution; pulling up said substrate from the chemical reinforcement solution and then annealing it to a temperature higher than the crystallization temperature of a molten salt; annealing the glass substrate at a rate at which the crystallization of the molten salt is deposited on the surface of the glass substrate; cleaning the surface of the glass substrate; and then forming at least a magnetic layer on the substrate.

A manufacturing method for a glass substrate for an information recording disk comprises the steps of chemically strengthening a glass substrate by immersing the glass substrate in a chemical reinforcement solution heated and then ion exchanging ions on the surface layer of the glass substrate with ions in the chemical reinforcement solution; and pulling up the substrate from the chemical reinforcement solution and then cleaning the surface of the glass substrate with a cleaning agent containing acid.

A magnetic recording disk manufacturing method comprises the step of chemically strengthening a glass substrate by immersing the glass substrate in a chemical reinforcement solution heated and then ion exchanging ions on the surface layer of the glass substrate with ions in the chemical reinforcement solution; cleaning the surface of the glass substrate pulled up from the chemical reinforcement solution with a cleaning agent containing acid; and then cleaning the surface of the glass substrate.

According to the first aspect of the present invention, a water-soluble inorganic material can be coated thinly and uniformly on the glass surface by adding a surface-active agent into an aqueous solution. The use of a solution including a surface-active agent and a water-soluble inorganic material allows an inorganic material coating, which prevents glass from being thermal bonded, to be formed (to several microns in thickness) such that correcting the flatness of a sheet glass is not disturbed. With no addition of the surface-active agent, it is difficult to form uniformly an smoothly a thin film. The solution which does not provide a film which can prevent glass from thermal bonding.

According to the second aspect of the present invention, since the ends of a glass substrate are treated with hydrofluosilicic acid, the surface roughness of the ends of the glass substrate is improved. Hence, dusting from the glass end surface can be prevented. The etching effect of the hydrofluosilicic acid is not very strong and can improve the end surface of a glass substrate to have a good surface roughness (Rmax less than 2 $\mu$m) at which dusting can be prevented, and does not deteriorate the roundness of the glass substrate. Furthermore, where the whole glass substrate is treated with a hydrofluosilicic acid, flaws caused by polishing and cutting the surface of a glass substrate can be decreased.

In the magnetic recording disk manufacturing method according to the second aspect of the present invention, adhesion of foreign matters due to dusting as well as flaws due to polishing and cutting the surface of a glass substrate can be reduced. Hence, high-quality magnetic recording disks with a small number of flaws can be manufactured at a high yield.

According to the third aspect of the present invention, the deposited molten salt which adheres to the glass substrate can be weakened by quickly cooling a glass substrate pulled up from the chemical reinforcement solution, and can easily remove the deposited molten salt by cleaning. Hence, a magnetic recording disk glass substrate with no abnormal protrusions can be manufactured. Since the glass substrate containing in a holding means holding with the end surfaces thereof is immersed into a chemical reinforcement solution, a deposited molten salt produced between the end surface of a glass substrate and the holding member is weakened. Hence, the end surface of a glass substrate can be prevented from being unintentionally broken when the glass substrate is taken out of the holding member. Moreover, since the chemically reinforce glass substrate has a compressive stress in the surface thereof and internally a tensile stress, possible fine flaws in the surface cause breakage of the glass substrate due to the cooling step. Hence, defective substrates can be easily distinguished.

According to the magnetic recording disk manufacturing method of the third aspect of the present invention, since a magnetic recording disk glass substrate with no abnormal protrusions and fine flaws in the surface thereof is used, a high-quality magnetic recording disk of which the number of defects due to abnormal protrusions and fine flaws are small can be manufactured at a higher yield.

According to the fourth aspect of the present invention, the glass substrate pulled up from the chemical reinforcement solution is cleaned with a cleaning agent including a sulfuric acid and/or phosphoric acid. Hence, the deposited molten salt can be effectively removed without damaging the glass substrate.

According to the magnetic recording disk manufacturing method of the fourth aspect of the present invention, the deposit molten salt is completely removed and a magnetic recording disk glass substrate with no minute flaws in the surface due to breakage of a glass substrate is used. Hence, high-quality magnetic recording disks with less defects can be manufactured at a high yield.

BRIEF DESCRIPTION OF THE DRAWINGS

FIG. 4 is the heating and annealing schedules in an embodiment of the glass flattening method according to the present invention;

FIG. 5 is data obtained by the flattening precess according to an aspect of the present embodiment; and FIG. 6 is an explanatory diagram used for explaining the data shown in FIG. 5.

DESCRIPTION OF THE PREFERRED EMBODIMENTS

Figure 1A:
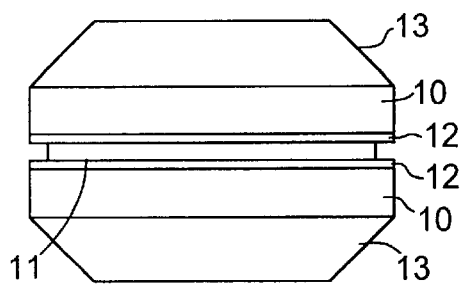
FIG. 1(a) is a front view illustrating a prior art treating method.
Figure 1B:
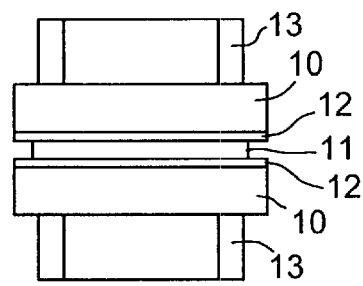
FIG. 1(b) is a side view illustrating a prior art treating method.

A sheet glass flattening method and a magnetic recording medium manufactured using a flattened glass substrate flattened by the sheet glass flattening method according to the first embodiment will be explained in detail hereunder.

According to the first embodiment, a laminated structure of a sole or plural sheet glass substrates, which are formed by the down-drawing method are sandwiched between densified sheets each with high flatness. Each sheet glass is flattened by heating under pressure and then annealing.

The sheet glass formed by the down-drawing method may be a sheet glass formed either by the conventionally-known down-drawing method including detail manufacturing requirements, or by a sheet glass with a shape equivalent to that of a sheet glass formed by he down-drawing method.

The sheet glass is not particularly limited in material, size, thickness, or the like. The material of a sheet glass may be aluminosilicate glass, soda-lime glass, chain-silicate glass, and the like.

The number of sheet glass substrates laminated is preferably 2 to 50, in view of the thermal conductivity of glass. The sheet glass substrates can be separately subjected to a flattening process, without laminating them.

A material with a the resistance and high conductivity is preferably used as the material of the densified sheet with high flatness, including for example SiC, a carbon sheet, a metal sheet such as aluminum, or the like. A quartz sheet, heat-resistant glass, or the like with low thermal conductivity may also be used. In this case, it is necessary to gently slope the annealing schedule and correspondingly to prolong the annealing time.

It is preferable that the surface flatness of the glass sheet in contact with the densified sheet is higher than that of the glass sheet. For example, it is preferable that the flatness be less than 10 $\mu$m which is accomplished by cutting and polishing the surface. Moreover, it is desirable that the densified sheet be thickened to maintain the flatness, thus preventing the deformation thereof. For example, it is desirable to be more than 10 mm for a SiC sheet, more than 15 mm for a carbon sheet, and more than 20 mm for an aluminum sheet. A fin may be arranged on the back surface of the densified sheet to prevent the deformation of the densified sheet.

In order to impose on a sheet glass, a densified sheet, a laminated sheet glass and a compressed sheet, for example, are piled in order. Then a loading sheet of a predetermined weight may be place on the laminated structure.

In order to execute the heating and annealing process, the heating temperature and heating time of the heating furnace are controlled to follow a predetermined heating and annealing schedule (temperature rising, temperature retaining, annealing, cooling) corresponding to a glass material. In this case, the heating temperature is necessary to be a temperature more than the distortion spot of glass. It is desirable to set the heating temperature to a temperature higher than the transition temperature of glass. The retention time is the time during which the load of a glass is sufficiently corrected by deforming the glass using the flatness of a densified sheet and a load and by uniforming the whole structure.

In the first embodiment, a solution includes a water-soluble inorganic material and a surface-active agent over at least one surface of a sheet glass substrate to flatten laminated plural sheet glass substrates.

In this case, there is at least one coating surface in each interface in the laminated sheet glass substrates. The coating surface intervenes between the densified sheet and the sheet glass. Needless to say, a solution including a water-soluble inorganic material and a surface-active agent may be applied on each surface (or surfaces) of each of the sheet glass substrates laminated.

As a water-soluble inorganic material, the following materials used: alkali hydroxide group (NaOH, KOH, etc.), alkali earth hydroxide (Ba(OH)2, Ca(OH)2, etc.), alkali (Na2SO4, organic alkali, etc.), sulfate such as ammonium sulfate, alkyl-ether ammonium sulfate, or the like, alkyd compounds, chelate compounds, and the like. These water-soluble inorganic materials may be used as a sole chemical or as a compound of two or more types of chemicals.

The surface-active agent may be an agent improving the wetting to glass and forming a thin film uniformly and evenly. The type of surface-active agent is not specially restricted in use.

When a water-soluble solution is applied unevenly, the uneven portion causes the glass to be thermally-bonded. More specifically, the surface-active agent reacts with the oxygen in the air during a heating process to produce carbon dioxide. The carbon dioxide reacts with alkali, alkaline earth, or the like added in the solution to produce carbonate, and a carbonate film is formed on the glass surface. As a result, the glass is thermally bonded.

Where ammonium sulfate is added to a water-soluble solution containing a surface-active agent, the ammonium sulfate added to the glass surface reacts with the sodium included in a glass component during a heating treatment so that a minute (dense) film of sodium sulfate is formed on the glass surface. Thus, the glass is thermally bonded.

The carbonate film and the sodium sulfate film can be easily washed away and removed after the heating treatment.

The surface-active agent may be an ionic surface-active agent such as anionic surface-active agent, cationic surface-active agent, amphoteric surface-active agent, or the like, a nonionic surface-active agent. These surface-active agents may be used singly or in a mixture of two or more types of agents.

The addition ratio of the surface-active agent and the water-soluble inorganic material is adjusted so as to form thinly and evenly a thermal-bonding prevention film on a glass surface. Other components such as alcohol, boron nitride, or the like may also be added to the solution including a water-soluble inorganic material and a surface-active agent.

The method of applying a solution including a water-soluble inorganic material and a surface-active agent on the surface of each sheet glass is not specially limited. For example, the solution may be applied using a spray gun, or a sponge soaked with a solution. In addition, the solution may be applied by immersing the sheet glass.

It is preferable to abject the coating thickness of the solution to a value at which the correction is not disturbed, for example, to several microns.

The sheet glass flattening method according to the first embodiment is preferably utilized to manufacture glass substrates for magnetic recording disks or glass substrates for LCDs (to be described later). However, the present invention should not be limited only to this embodiment. This invention also is applicable to flatten the surfaces of glass substrates for photomasks or optical disks, or other conventional glass sheets.

Next, an explanation will be made below as to a glass sheet manufactured using the sheet glass flattening method according to the first embodiment.

A glass sheet is usually subjected to cutting and forming in predetermined size and shape, beveling, surface polishing, surface-chemical strengthening, and the like, to form various glass substrates.

The sheet glass manufactured using the sheet glass flattening method can be used as various glass substrates requiring a high-surface smoothness through a simple polishing step or no polishing step. Therefore, the sheet glass can be manufactured at very low cost, compared with the conventional sheet glass.

For example, the magnetic recording disk substrate has been conventionally manufactured by polishing a 3 mm or more thick glass sheet by 2 mm because it is difficult to fabricate a magnetic recording disk sheet using a thin glass substrate. However, the magnetic recording disk glass substrate can be formed merely by cutting and processing a thin glass manufactured by the sheet glass flattening method in predetermined size and shape and then slightly polishing the surface thereof. Hence, the magnetic recording disk substrate is excellent and can be manufactured at a very low cost.

If a thin glass prepared using the above-described sheet glass flattening method is adjusted to a predetermined size and shape, an LCD glass substrate can be manufactured superbly and at a very low cost merely by surface-polishing it without cutting.

FIG. 5 is data showing warpage and deflection improved by the flattening process according to an aspect of the present embodiment. FIG. 6 is an explanatory diagram showing the state where warpage and deflection occur in the glass substrate 1, and wherein a corresponds to the datum length a in FIG. 5 and b corresponds to the warpage and deflection amount b in FIG. 5.

Next, another example according to the first embodiment will be explained below.

According to another example of the first embodiment, the magnetic recording medium is characterized by the steps of polishing the principal surface of a sheet glass subjected to the sheet glass flattening method, thereafter chemically strengthening the result through an ion exchanging step, and then forming at least a magnetic layer.

In comparison with conventional sheet glass, the sheet glass subjected to the sheet glass flattening method has excellent flatness and an excellent surface condition. Therefore, since flaws (marks) and bonded foreign matters which are unremovable in the polishing step do not remain on the substrate, the surface remains in good condition. The good surface condition does not cause the head crush of a completed magnetic recording disk or an error due to a defect formed in a layer such as a magnetic layer.

The magnetic recording medium according to the second embodiment is manufactured using the above-described inexpensive glass substrate. Since the polishing step can be further simplified, the magnetic recording medium can be priced at a very low amount, compared with the conventional one. For example, compared with the use of the magnetic recording disk substrate manufactured by polishing a 3 mm or more thick glass sheet by about 2 mm, a magnetic recording disk substrate of less than 1 mm thick can be obtained by slightly polishing a glass sheet of 1 mm or more thick so that the short polishing time results in a decrease in cost.

The magnetic recording medium which usually has a predetermined flatness and surface roughness, is formed by sequentially laminating an underlayer, a magnetic layer, a protection layer, and a lubricant layer on a magnetic recording disk glass substrate of which the surface is chemically reinforced.

In the magnetic recording medium, nonmagnetic thin films such as Cr, Mo, Ta, Ti, W, and Al may be used as the underlayer. The underlayer may also be formed of a multi-underlayer including Al/Cr/CrMo, Al/Cr/Cr, or the like.

As the magnetic layer, a magnetic thin film including CoPtCr, CoNiCrTa, or the like, in addition to Co acting as a major component may be used. The magnetic layer may be formed of a multi-layer structure such as CoPtCr/CrMo (or CrV)/CoPtCr which is designed to reduce noises with non-magnetic layers divided.

As the protection layer, for example, a Cr film, a Cr alloy film, a carbon film, a zirconia film, a silica film, and the like may be used. These protection films can be sequentially formed by in-line-type sputtering apparatus, together with the underlayer and the magnetic layer. These protection films may be formed singly or of a multilayer structure of different kinds of films.

Another protection layer may be more formed on the above-mentioned protection layer. For example, a tetra-alkoxysilane diluted with a solvent of alcohol is coated on the protection layer and then a sintered silicon oxide ($SiO2$) may be further formed on the resulting structure.

The lubricant layer is generally formed by diluting a perfluoropolyether (PFPE) acting as a liquid lubricant, with a solvent such as a Freon series, then coating the result on the medium surface by the dipping method, spin-coating method, or spraying method, and, if necessary, thermally heating it.

FIRST EXAMPLE

The first embodiment will be explained below in more detail according to following examples Example 1-1

Figure 2:
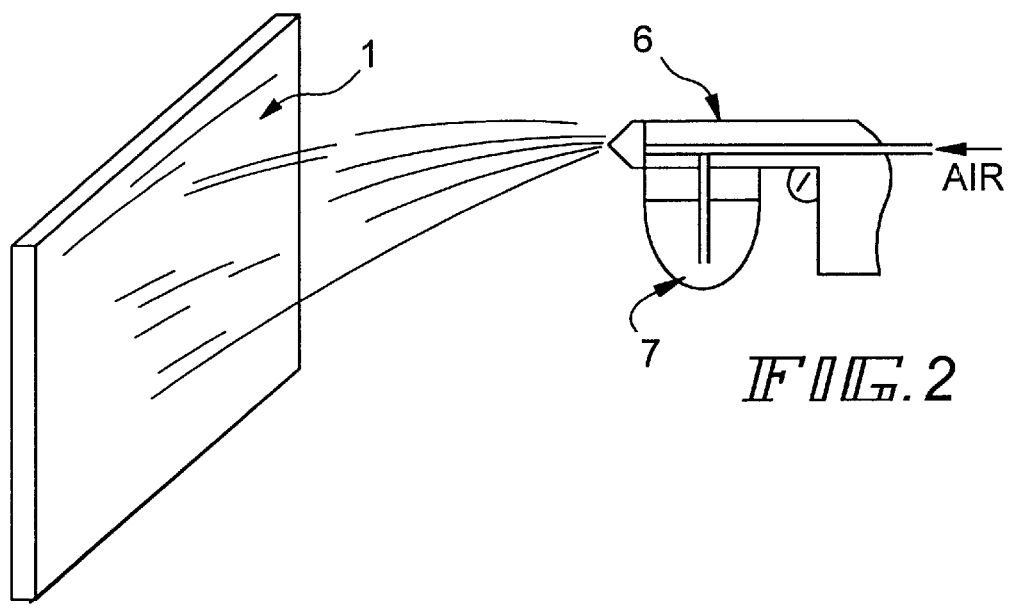
FIG. 2 is an explanatory view illustrating an embodiment of an aqueous solution coating step in a sheet glass flattening method according to the present invention.

30% of a caustic soda (NaOH) is dissolved into an aqueous solution into which 10% of a commercially-available surface-active agent is added. The aqueous solution 7, as shown in FIG. 2, is lightly coated (2 $\mu$m) on the surface of a sheet glass (of an aluminosilicate glass) 1 using a spray gun 6.

Figure 3:
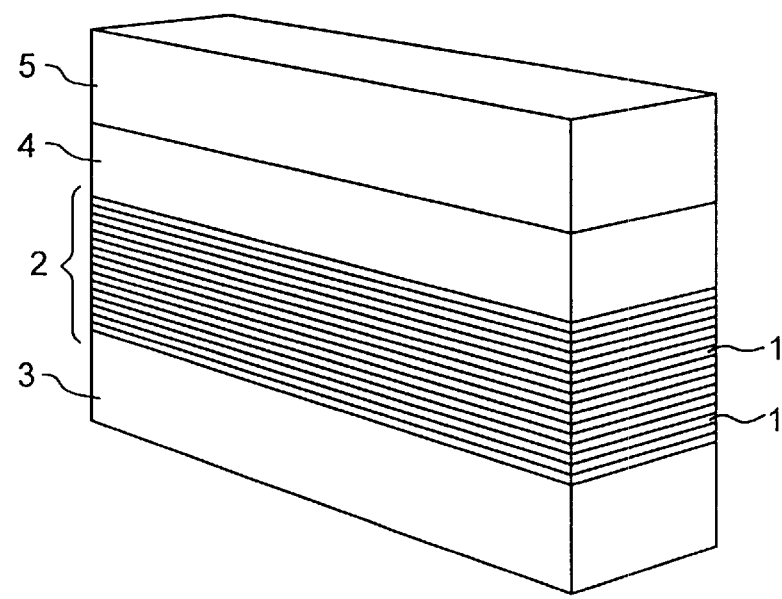
FIG. 3 is an explanatory view illustrating an embodiment of the glass flattening method according to the present invention.

Next, as shown in FIG. 3, 15 laminated sheet glass substrates 1 coated with an aqueous solution, or the laminated sheet glass (group) 2, are placed on a SiC thick sheet 3 (of 25 mm thick) which has a cut and polished surface with a flatness of less than 10 $\mu$m. Moreover, a SiC thick sheet 4 (of 25 mm thick) having the same flatness as the thick sheet 3 is placed on the laminated sheet glass 2 lying on the thick sheet 3. A steel member 5 of 30 kg is placed on the thick sheet 4 to impose a load.

A sheet glass flattening process is performed by heating and annealing the laminated sheet glass 2 set described above according to the annealing schedule a shown in FIG. 4.

The glass sheet is sufficiently cooled through annealing and then is taken out of a furnace. The surface of the glass sheet is covered with a white film of a carbonate changed from alkali. Hence, the glass sheets are not thermally bonded each other. The white film can be easily removed by washing without marking the glass surface.

As a result, a 300×300×1.1 mm sheet glass has a flatness of 50 $\mu$m or less. Each of 66 mm 0 magnetic recording disk substrates obtained by cutting the sheet glass has a flatness of 5 $\mu$m or less (2 $\mu$m or less on average).

The glass transition point of the sheet glass used is 500° C. Heating at a temperature of 500° C. or more is sufficient to obtain the above-mentioned result. It is necessary to hold the retention time for 5 hours to make the whole structure uniform. The flattening temperature must be over the distortion temperature. Therefore is necessary to heat the glass to 400° C. or more. The retention temperature must be prolonged at a temperature of less tan 500° C. It is necessary to prolong the retention time to 10 hours at a heating temperature of 450° C.

Comparison example in the first embodiment

The sheet glass flattening process is performed similarly to example 1-1, except that a paper (interleaving paper) is inserted between the glass sheets, without coating an aqueous solution on the glass substrate. At a result, a 300×300× 1.1 mm sheet glass with a flatness of 150 $\mu$m or less was obtained. Each of 66 mm 0 magnetic recording disk substrates obtained by cutting the sheet glass has a flatness of 15 $\mu$m or less (8 $\mu$m or less on average).

A considerable period of time is needed to obtain an LCD glass substrate by polishing the 300×300×1.1 mm sheet glass. Further, since the LCD glass substrates were thin and large, some were broken during the polishing process. It is difficult to manufacture a magnetic recording disk glass substrate by polishing a 1.1 mm thin glass because the flatness is fairly worsened.

As apparent from the above-mentioned embodiment 1-1 and comparison example 1-1, according to the sheet glass flattening method of the first embodiment, a considerable high flatness and good surface condition are obtained, in comparison with the conventional method. Because of the easy cleaning process, the previous steps up to the polishing step can be shortened, and the production efficiency can be improved. Furthermore, since no flaws are formed by dusts in the air when a paper is inserted, the yield is improved so that a cost reduction can be realized.

Examples 1-2 to 1-3

A sheet glass flattening process is carried out similar to the example 1, except that a caustic potash (KOH) (Example 1.2) and an alkyl acid ether sodium sulfate (Example 1-3) are used instead of caustic soda as a water soluble inorganic material. The result is almost similar to that in example 1-1.

Example 1-4

A sheet glass flattening process is performed similar to example 1-1, except that an ammonium sulfate is used instead of caustic soda as a water soluble inorganic material. The result is almost similar to that in example 1-1. The surface of the glass sheet after the annealing is covered with a dense film of sodium sulfate. The film can be easily removed by water cleaning.

Example 1-5

In order to finish the surface roughness, Rmax, to about 20 angstroms, a 66 mm0 magnetic recording disk glass substrate with a flatness of 5 um or less (2 $\mu$m or less on average) as manufactured in example 1-1, is beveled, then sand-blasted with #400 and #1000 abrasive grains, then polished with a cerium oxide ($CeO_2$), and finally cleaned.

Next, a chemical reinforcement is made by subjecting the above-mentioned disk glass substrate to a low-temperature ion exchanging treatment. In the conventional sheet glass flattening process, flaws and fused foreign matters which cannot be removed in the pre-polishing step, still remain during this ion exchange. As a result, a uniform chemical reinforcement sometimes cannot be performed. However, the flattening process according to the present invention provides for a uniform chemical reinforcement and the prevention of damage due to uneven stress.

Next, an underlayer consisting of Al (of a thickness of 50 angstroms) /Cr (1000 angstroms) /CrMo (100 angstroms), a magnetic layer consisting of CoPtCr (120 angstroms) /CrMo (50 angstroms) /CoPtCr (120 angstroms), and a protection layer of Cr (50 angstroms thick) are formed on both sides of the substrate by an in-line sputtering apparatus.

The substrate is then immersed into an organic silicon compound solution in which silica fine particles (of a particle diameter of 100 angstroms) are dispersed, and then sintered to form a $SiO_2$ protection layer. Furthermore, the protection layer is dipped into a lubricant consisting of a perfluoro polyether to form a lubricant layer 7. Thus, a magnetic recording disk used for a MR (Magnetic Resist Type) head can be obtained.

In a magnetic heat flying test of the above-mentioned magnetic recording disk, it was confirmed that a head crush does not occur. Moreover, it was confirmed that when there are no defects in the substrate surface it does not cause any defects in a film such as a magnetic layer.

The magnetic recording disk described above is less expensive than a conventional one and has no defects on the substrate surface. Hence, it was ascertained that the magnetic recording disk has no error causing defects which harm the magnetic film formation but instead has excellent magnetic characteristics.

Example 1-6

In a similar manner to example 1-5, a thin-film head magnetic recording disk is obtained. However, the underlayer is formed of Al/Cr/Cr and the magnetic layer is formed of CoNiCrTa. With this magnetic recording disk, advantages similar to that in example 1-5 were confirmed.

The first embodiment has been explained according to the preferable examples. However, this invention should not be limited only to the above-described examples.

As described above, according to the sheet glass flattening method of the present invention, the thermal bonding between laminated thin sheet glass substrates is prevented. Further, the plural laminated thin sheet glass substrates can be treated effectively and thermally without producing flaws or bonding foreign matters, and can thus be formed with a flatness of higher accuracy. As a result, the thin glass substrate according to the present embodiment has an excellent flatness and is not expensive.

Moreover, in the magnetic recording medium according to the first example, the glass substrate has an excellent flatness, and foreign matters are not bonded on the substrate surface. Hence, the head crush can be prevented. Since no flaws occur on the substrate surface, no defects occur in a film such as a magnetic layer.

Next, glass substrate for an information recording disk manufacturing method and a magnetic recording disk manufacturing method according to the second embodiment will be explained below in detail.

In an information recording disk manufacturing method according to the second embodiment, at least the end surface (including a beveling portion and a side wall portion) of a disklike glass substrate flattened according to the first embodiment is treated with a treating solution including a hydrofluosilicic acid (hereinafter referred to as hydrofluosihcic acid treating solution).

Treating with a hydrofluosilicic acid solution (hereinafter referred to as a hydrofluosilicic acid treatment) is carried out after any one of steps of cutting and polishing a disklike glass substrate, or after each step. Usually, it is desirable to do the hydrofluosilicic acid treatment after an accurate cutting step.

The cutting and polishing step is roughly divided into (1) a roughing cut (coarse cutting), (2) sand blasting (fine polishing), (3) first polishing, and (4) second polishing (final polishing).

The hydrofluosilicic acid treatment may be carried out by contacting only the end surface of a glass substrate to a hydrofluosilicic acid solution, or by contacting the whole glass substrate to the solution.

In order to contact only the end surface of a glass substrate to a hydrofluosilicic acid solution, laminated glass substrates, for example, are immersed into the hydrofluosilicic acid solution.

Contacting the whole glass substrate to a hydrofluosilicic acid solution can be performed when cleaning the surface of the glass substrate. Hence, the glass substrate washing step and the glass substrate end surface treating step can be performed as a single step at one time by cleaning with a hydrofluosilicic acid solution, instead of the convention cleaning with pure water.

It is preferable to subject the outer end surface and inner end surface of a glass substrate to the hydrofluosilicic acid treatment, but it is possible to apply the same acid treatment only to either end surface.

A fluosilicic acid (H2SiF6) is typically used as the hydrofluoric acid. In order to improve the cleaning effect and the like, fluoric acid (such as hydrofluoric acid) and commercially available cleaning agents (for example, neutral detergent, surface-active agent, alkali detergent, or the like) can be added in trace amounts as the hydrofluosilicic acid treating solution.

The concentration of the hydrofluosilicic acid is 0.01 to 10 per cent by weight. In a concentration of less than 0.01 wt % hydrosulfilic acid shows a poor etching effect and cleaning effect, but a concentration of more than 10% causes rough surfaces and dusting.

The treating period preferably ranges from 1 to 10 minutes. Where the treating period is less than 30 seconds, the good surface roughness (Rmax 2 μm or less), at which dusting from the glass substrate end surface can be prevented, cannot be obtained. In the case of a treating period of 15 minutes or more, the roundness of the glass substrate is impaired or the surface roughness of the end deteriorates.

Where the hydrofluosilicic acid treatment is performed after each of steps of cutting and polishing, the total treating period is selected to cover the whole treatment range. The treating temperature is preferably 10 to 50° C.

The kind, size, thickness, etc. of the glass substrate are not particularly restricted. The material of the glass substrate may be, for example, aluminosilicate glass, soda-lime glass, soda-aluminosilicate glass, aluminoborosilicate glass, borosilicate glass, quartz glass, chain silicate glass, or the like. The hydrofluosilicic acid has an especially good chemically etching controllability with aluminosilicate glass. Hence, a good surface roughness, which can easily prevent dusting from the end surface of a glass surface, can be obtained without impairing the roundness of the glass substrate.

The aluminosilicate glass preferably includes as main components $SiO_2$ of 62 to 75 wt %, $Al_2O_3$ of 5 to 15 wt %, $Li_2O$ of 4 to 10 wt %, $Na_2O$ of 4 to 12 wt %, and $ZrO_2$ of 5.5 to 15 wt %. The chemical reinforcement glass preferably includes $Na_2O/ZrO_2$ of a weight ratio of 0.5 to 2.0 and $Al_2O_3/ZrO_2$ of a weight ratio of 0.4 to 2.5.

Such a chemically strengthened aluminosilicate glass has the increased bend-brittle strength, deep compressed stress layer, and excellent Knoop hardness.

In the second embodiment, the step of chemically strengthening a glass substrate surface by the ion exchanging method may be added as a post step in the magnetic recording disk glass substrate manufacturing method.

The chemical strengthening method is not specially limited as a conventional well-known chemical strengthening method may be selected. However, it is preferable to select the low temperature reinforcement where the ion exchange is performed in the regions not exceeding the transition point, in the view of the glass transition point. Potassium nitrate, sodium nitrate, and nitrate in combination are examples of the alkali molten salt used for the chemical reinforcement.

The above-described hydrofluosilicic acid treatment can be applied to the glass substrate for an information recording disk after the chemical reinforcement.

The glass substrate for an information recording disk manufacturing method according to the second embodiment can be utilized as a method of processing the end surface of an electronic optical disk substrate such as magnetic recording disk glass substrate, an optical magnetic recording disk glass substrate, an optical disk kept away from dusts, an optical memory, or the like.

By using the chemically strengthening method according to the present invention described above, a compressive strain layer is formed 50 μm depth from the surface of the glass substrate. The tensile stress value of a tensile stress layer inside the compressive strain layer is 4 kg/mm$^2$ or less.

The sheet glass used in the second embodiment may be shaped using the pressing method.

The magnetic recording disk manufacturing method according to the second embodiment will be explained below.

In the magnetic recording disk manufacturing method according to the second embodiment, a magnetic layer is formed at least on a magnetic recording disk glass substrate as a post step of the above-mentioned magnetic recording disk glass substrate manufacturing method.

According to the second embodiment, since a dust- and defect-free glass substrate is used, a high-quality magnetic recording disk can be obtained. Namely, the frequency of the head crush of the magnetic recording disk will be very small using a glass substrate with a good surface condition and of less dusting, compared with the conventional one. Moreover, there are no problems that a defect may occur in a film such as a magnetic layer, thus resulting in an error.

The magnetic recording medium is usually manufactured by sequentially laminating an underlayer, a magnetic layer, a protection layer, and a lubricant layer, on a magnetic recording disk glass substrate.

The magnetic recording medium is usually manufactured with its predetermined flatness and surface roughness where the surface is chemically reinforced.

In the magnetic recording medium, nonmagnetic thin films such as for example Cr, Mo, Ta, Ti, W, Al, and the like may be used as the underlayer. The magnetic recording medium may be formed of a multi-underlayer of Al/Cr/CrMo or Al/Cr/Cr.

A magnetic thin film of CoPtCr or CoNiCrTa including Co as a major component, for example, may be used as the magnetic layer. The magnetic layer may have nonmagnetic films divided and may be formed of a multilayer structure of CoPtCr/CrMo/CoPtCr, or the like to reduce noises. The magnetic layer may be a magnetic layer for horizontal magnetic recording or vertical magnetic recording.

For example, a Cr film, a Cr alloy film, a carbon film, a zirconia film, a silica film, and the like may be used the protection layer. These protection films can be sequentially formed together with the underlayer and the magnetic layer, and the like, using an in-line sputtering apparatus. These protection films may be formed as a single layer or a multilayer structure formed of the same or different kinds of films.

Other protection layers may be further formed on the above-mentioned protection layer. For example, a tetra-alkoxysilane diluted with an alcohol series solvent may be coated on the protection layer. Then a sintered silicon dioxide (SiO2) may be formed.

The lubricant layer, for example, is formed by diluting a perfluoro polyether (PFPE) acting as a liquid lubricant agent with a Freon series solvent, coating the diluted agent on the medium surface according to the dipping method, spin-coating method, or spraying method, and then, if necessary, heating the resultant.

EXAMPLES OF THE SECOND EMBODIMENT

The second embodiment will be explained below in more detail according to the following examples.

Example 2-1

(1) Coarse Polishing Step

First, a glass substrate formed of a 96 mm0, 3 mm thick dislike aluminosilicate glass is prepared by cutting a sheet glass formed by the down-drawing method and the flattening method according to the first embodiment, with a cutting whetstone. Thus, a 96 mm0 diameter, 1.5 mm thick substrate is formed by cutting the glass substrate with a relatively coarse diamond whetstone.

A chemical reinforcement glass including SiO2 of 63 wt %, A1203 of 14 wt %, Li2O of 6 wt %, Na2O of 10 wt %, and ZrO2 of 7 wt % as major components is used as an aluminosilicate glass.

Next, both surfaces of the glass substrate are polished alternately using a diamond whetstone with finer grain than that of the above-mentioned whetstone. In this case, the load is about 100 kg. Thus, the surface roughness Rmax (measured in JISB0601) of either surface of the glass substrate is finished to about 10 μm.

First cleaning step

The surface of the glass substrate after the shaping process is then rinsed.

(2) Sand-blasting (Lapping) Step

Next, the glass substrate is subjected to a sand-blasting process. This sand-blasting process is carried out to improve the size accuracy and shape accuracy. The sand-blasting process is carried out using a lapping apparatus. The sand-blasting was performed twice by changing the abrasive grain from grain size #400 to grain size #10000.

In detail, first, both the surfaces of a glass substrate housed in a carrier are lapped so as to have to surface accuracy of 0 to 1 μm and a surface roughness of (Rmax) of about 6 μm by using alumina grains of grain size #400, setting a load L of about 100 kg, and by rotation the inner gear and the outer gear.

Next, grain size #1000 of alumina abrasive grain is selected to lap the surface roughness (Rmax) to about 2 μm.

Second cleaning step

The glass substrate, which has been sand-blasted, is cleaned by sequentially immersing it into a hydrofluosilicic acid (of 2% concentration) bath, a neutral cleaning agent bath, a neutral cleaning bath, and a water bath. The immersing period of the hydrofluosilicic acid is 1 to 3 minutes. Ultrasonic waves are also applied to each cleaning bath. Cleaning with the hydrofluosilicic acid sets the surface roughness of each of the outer end surface and the inner end surface to 3 μm, without impairing the roundness.

(3) First Polishing Step

Next, the first polishing step is carried out. This polishing step is implemented using a polishing apparatus to remove flaws and distortions left in the sand-blasting step.

In detail, a hard polisher (e.g. a cerium pad MHC15 manufactured by SPEEDFAM CO.) Is used as a polisher (e.g. polishing powder). The first polishing step is made under the following polishing requirements:

Polishing solution: Cerium oxide+water

Load: 300 g/cm$^2$ (L=238 kg)

Polishing period: 15 minutes

Amount removed: 30 μm
Lower sheet rotation number: 40 rpm
Upper sheet rotation number: 35 rpm
Inner gear rotation number: 14 rpm
Outer gear rotation number: 29 rpm
Third cleaning step The glass substrate which has been sand-blasted is then cleaned by sequentially immersing it into a hydrofluosilicic acid (of 2% concentration) bath, a neutral cleaning agent bath, a pure water bath, a pure water bath, an IPA (isopropyl alcohol), and an IPA (steam drying) bath. The immersing period of the hydrofluosilicic acid is 1 to 3 minutes. Ultrasonic waves are also applied to each cleaning bath.

Cleaning with the hydrofluosilicic acid sets the surface roughness of each of the outer end surface and the inner end surface to 2 μm, without impairing the roundness.

(4) Second Polishing Step

Next, the polishing apparatus used in the first polishing step is used. Then the second polishing step is performed by changing a hard polisher to a soft polisher (e.g. Polirax manufactured by SPEEDFAM CO.). The polishing requirement is same as that in the first polishing step, except that the load is 100 g/cm$^2$, the polishing period is 5 minutes, and the amount removed is 5 μm.

Forth cleaning step

The glass substrate, which has been sand-blasted, is then cleaned by sequentially immersing it into a neutral cleaning agent bath, a neutral cleaning agent, a pure water bath, a pure water bath, an IPA (isopropyl alcohol), and an IPA (steam drying) bath. Ultrasonic waves are applied to each cleaning bath.

(5) Chemical Strengthening Step

Next, the glass substrate, after the cutting and polishing steps have been finished, is chemically reinforced. The chemical reinforcement is made by preparing a chemical reinforcement solution obtained by mixing potassium nitride (60%) and sodium nitride (40%), heating the chemical reinforcement solution at 400° C., preheating the glass substrate at 300° C., and then immersing the cleaned glass substrate into the solution for 3 hours. In order to chemically reinforce the whole surface of the glass substrate, the immersing operation is performed by containing the plural glass substrates in a holder, with the end surfaces held.

As described above, lithium ions and sodium ions in the surface layer of the glass substrate are respectively replaced by sodium ions and potassium ions in the chemical reinforcement solution when the glass substrate is immersed into chemical reinforcement solution. Thus, the glass substrate is reinforced.

The compressed stress layer formed on the surface layer of the glass substrate has a thickness of about 100 to 200 μm.

The glass substrate chemically reinforced is immersed into a water bath of 20° C. to cool rapidly, and then maintained for about 10 minutes.

Fifth cleaning step

The glass substrate, after being rapidly cooled, is heated at about 40° C., immersed into a sulfuric acid, and then cleaned under ultrasonic waves. Any foreign matter is not recognized in an inspection of the surface of the glass substrate thus obtained. Cleaning with the sulfuric acid does not cause any change in the surface roughness of the outer peripheral end surface or the inner peripheral end surface, or the roundness.

(6) Magnetic Recording Disk Manufacturing Step

Using an in-line sputtering apparatus, a magnetic recording disk is obtained by sequentially forming a Cr underlayer, a CrMo underlayer, a CoPtCr magnetic layer, and a C protection layer on the surfaces of the magnetic recording disk glass substrate obtained in the above-described step.

When the magnetic recording disk thus formed was subjected to a gliding test, neither a hit (where a head grazes protrusions formed one the surface of a magnetic recording disk) nor a crush (where a head collides with a protrusion formed on the surface of a magnetic recording disk) were not discerned. Moreover, it was confirmed that no occurrence of foreign or defects due to dusting occurred and resulted in no defects in a film such as a magnetic layer.

Example 2-2

This process is similar to example 2-1, except that the hydrofluosihcic acid cleaning process is performed only in the second cleaning step, and hydrofluosilicic acid is not used in the other cleaning steps. A magnetic recording disk glass substrate as well as magnetic recording disk are obtained through this process. The result is similar to that in example 2-1.

Example 2-3

This process is similar to example 2-1, except that the hydrofluosilicic acid cleaning process is performed in the second to fourth cleaning steps. A magnetic glass substrate as well as a magnetic recording disk are obtained through such a process. The result is similar to that in example 2-1.

Examples 2-4 and 2-5

This process is similar to example 2-1, except that soda-lime glass (example 2-3) and soda-aluminosilicate glass are used instead of the aluminosilicate glass. A magnetic glass substrate as well as a magnetic recording disk are obtained.

As a result, in the case of soda-lime glass the surface of the outer peripheral end surface and the inner peripheral end surface of a glass substrate is 3 μm. The surface is rough, compared with the use of aluminosilicate glass. However, there is no problem with dust prevention in practical use.

Example 2-6

An underlayer of Al (50 angstroms thick) /Cr (1000 angstroms) /CrMo (100 angstroms), a magnetic layer of CoPtCr (120 angstroms) /CrMo (50 angstroms) /CoPtCr (120 angstroms), and a Cr (50 angstroms) protection layer are formed on both surfaces of a magnetic recording disk glass substrate obtained in example 1 by an in-line sputtering apparatus.

The above-described substrate is immersed into an organic silicon compound solution (a mixed solution of water, IPA, and tetraethoxysilane) dispersed with silica fine particles (of a particle size of 100 angstroms), and then sintered to form a SiO2 protection layer. Moreover, the protection layer is dipped into a solvent of perfluoropolyether to form a lubricant layer. Thus, a magnetic head is obtained.

The magnetic recording disk obtained was subjected to a gliding test. No hit or clash was observed. It was confirmed that there was no defect in a film such as a magnetic layer.

Example 2-7

This process is similar to example 5, except that the underlayer is formed of Al/Cr/Cr, and the magnetic layer is formed of CoNiCrTa. Thus, a magnetic recording disk for a thin-film head is obtained. As to the magnetic recording disk, a result similar to that in the example 2-5 was confirmed.

Reference 1

This process is similar to example 1, except that a fluoric acid is used instead of a hydrofluosilicic acid, and a hydrofluosilicic acid cleaning treatment is not performed. Thus, a magnetic recording disk glass substrate and a magnetic recording disk were obtained.

As a result, the surface roughness of the outer peripheral surface and the inner peripheral surface of the glass substrate is 4 to 5 μm, and the roundness is deviated from a allowable value. It is understood that the center deviation results in a defective product. As described here, the fluoric acid treatment damages largely glass and has a poor etching controllability.

The magnetic recording disk obtained was subjected to a gliding test, and a hit or crush was observed.

The second embodiment has been described with the above-mentioned examples. However, the embodiment should not be limited only to the examples.

For example, a commercially available surface-active agent and a cleaning agent (for example alkali cleaning agents) may be used in the cleaning step, instead of a neutral cleaning agent.

Moreover, as a polishing agent can be used cerium oxide ($CeO_2$), alumina ($y-Al_2O_3$), iron oxide red ($Fe_2O_3$), chromium oxide ($Cr_2O_3$), zirconium oxide ($ZrO_2$), titanium oxide ($TIO_2$), and the like can be used. An element material of suede velour may be used as a soft polisher, and hard velour, urethane foam, pitch-sintered suede, and the like may be used as a hard polisher.

As described above, in accordance with the method of manufacturing for an information recording disk of the second embodiment, since the end surface of the glass substrate is treated with hydrofluosilicic acid, the surface roughness of the end surface of the glass substrate is improved, whereby dusting from the glass end surface can be prevented.

The hydrofluosilicic acid, having a weak etching effect, can also improve the surface roundness of the end surface of a glass substrate, thus preventing dusting from the glass end surface.

Moreover, in accordance with the magnetic recording disk manufacturing method of the second embodiment, adhesion of foreign matters as well as marks due to polishing and cutting a glass substrate surface can be reduced. As a result, a high-quality magnetic recording disk with no flaws can be manufactured at a high yield.

A magnetic recording medium such as a magnetic recording disk, has been described as the application field of the second embodiment. However, the second embodiment is not limited only to the examples. The second embodiment is also advantageously applicable to glass substrates for an information recording disk such as optical memories.

Next, a detailed explanation will be made below as to the information recording glass manufacturing method and magnetic recording disk manufacturing method according to the third embodiment of the present invention.

As to the third embodiment, the present inventors have studied the reason why abnormal protrusions occur on the surface of a magnetic recording disk. The inventors found that deposited molten salt (e.g. KCL), which adhered stubbornly on a glass substrate pulled up from a chemical reinforcement solution, cannot be removed by a cleaning treatment, and the deposited molten salt being a foreign matter causes abnormal protrusions on the surface of a magnetic recording disk.

We have further proceeded to continue this study in consideration of this knowledge. As a result, the adhesion conditions of the deposited molten salt to a substrate are different in the cooling step after the chemical reinforcement. In detail, the deposited molten salt adheres strongly to a substrate in a slow cooling step like natural heat-dissipation, but the deposited molten salt obtained through a rapid cooling step is very brittle and is easily washed away. Thus, we have come to conception of the third embodiment.

According to the magnetic recording disk glass substrate manufacturing method of the third embodiment, first a glass substrate formed according to the first embodiment is immersed into a heated chemical reinforcement solution and then chemically reinforced by exchanging ions in the glass substrate surface layer for ions in the chemical reinforcement solution.

A low-temperature in exchanging method, a high-temperature ion exchanging method, a surface crystallizing method, a glass surface dealkali method, etc. are all well known ion exchanging method.

The low-temperature ion exchanging method is a method of strengthening the glass surface by replacing alkali ions in the glass with alkali ions having an in radius larger than the alkali ions therein over a temperature range less than the glass transition point Tg and then producing a strong compressed stress to the glass surface layer because of an increased capacity in the ion exchanged portion.

As the chemical reinforcement solution, a molten salt such as potassium nitride ($KNO_3$), sodium nitride ($NaNO_3$), and potassium carbonate ($K_2CO_3$), a molten salt of in combination of the above-listed salts ($KN_3+NaNO_3$, $KNO_3+K_2CO_3$, or the like), a molten salt made by mixing the above-listed salts with a salt of $Cu^+$, $Ag^+$, $Rb^+$, $Cs^+$, or the like, and the like may be used. The chemical reinforcement solution may be a solution of one of the above-listed salts, instead of the molten salt.

It is preferable that the heating temperature is 350° C. to 650° C., and particular 350° C. to 480° C., and more particularly 350° C. to 450° C., in view of the glass transition point.

It is preferable that the immersion period is 1 to 20 hours, in view of the bend-brittle strength and stress distortion layer.

It is preferable that the compressed stress layer formed in the glass substrate surface layer has a thickness of 60 to 300 μm, in view of increasing the shock resistance and vibration resistance.

In order to prevent a glass substrate from breaking or cracking, preferably the glass substrate is preheated at 200 to 350° C., prior to immersing the glass substrate into a molten salt. In the chemical strengthening step, it is preferable to hold the end surface of glass substrate for chemical reinforcement to chemically strengthen the whole surface of the glass substrate.

In the third embodiment, after the chemical reinforcement, the glass substrate is pulled up from the chemical reinforcement solution to anneal to a predetermined temperature (a temperature higher than the temperature at which crystallization of a molten slat begins).

The lower temperature in the annealing is not unconditionally determined because it depends on the kind of chemical reinforcement solution used (the kind of deposited molten salt). However, it is preferable to anneal to a higher temperature than the temperature at which the crystallization of the molten salt begins.

Preferably the annealing rate of the glass substrate is 2° C./min. to 100° C./min., and particularly 5° C./min. to 60° C./min., and more particularly 10° C./min to 50° C./min.

In the third embodiment, the glass substrate is rapidly cooled at the rate at which crystallization of the molten salt deposited on the glass substrate surface after annealing is prevented.

Preferably the rate of rapidly cooling the glass substrate is 1600° C./min to 200° C./min., particularly 1200° C./min. to 300° C./min., and more particularly 800° C./min. to 400° C./min.

It is preferable to rapidly cool the glass substrate by contacting it with a refrigerant carrier of, preferably, 100° C. to 0° C., and more preferably 40° C. to 10° C., in the view of discriminating a failure product due to heat shock.

Preferably the contact time of the glass substrate to a refrigerant carrier is about 10 to 60 min., in the view of the cleaning effect.

As the refrigerant carrier a liquid refrigerant carrier such as water, warm water, solution, liquid nitrogen, or the like; a gas refrigerant carrier such as nitrogen, moisture vapor, cooled air; air blasting; and the like may be used.

In the third embodiment, the glass substrate is cleaned after the rapid annealing and then the deposited molten salt adhered to the glass substrate is removed.

If there is a suitable deposited molten salt removing method, the cleaning method is not specially limited. For example, as the cleaning method the method of immersing and cleaning a glass substrate in an acid such as heated sulfuric acid, phosphoric acid, nitric acid, fluoric acid, hydrochloric acid, or the like, a mixed acid of a combination of them, or one of these acids plus a salt thereof or the like may be used. In this case, the glass substrate may be cleaned with ultrasonic waves. After the acid cleaning, a well-known method of cleaning such as a cleaning with a commercially available cleaning agent (for example, a neutral cleaning agent, surface-active agent, alkaline cleaning agent, or the like), a scrubbing cleaning, pure water cleaning, a solvent cleaning, or solvent drying, or the like may be done. Each cleaning may be carried out while heating or applying ultrasonic waves.

An ion exchangeable glass substrate may be selected as a glass substrate, without any limitation, especially as to the size and thickness of the glass substrate.

As the glass substrate material, for example, a multi-component series glass containing ion changeable ions such as lithium ions ($Li^+$) or sodium ion ($Na^+$) of aluminosilicate glass, soda-lime glass, soda-aluminosilicate glass, or the like may be used.

Aluminosilicate glass which exhibits its high strength, deep compressed stress layer, excellent shock resistance, and excellent vibration resistance after a chemical reinforcement, is especially preferable. Such aluminosilicate glass, being an aluminosilicate glass containing the component according to the second embodiment which is chemically reinforced, exhibits its excellent heat resistance and good flatness due to no Na deposit under high-temperature circumstances, and excellent Knoop hardness.

The magnetic recording disk glass substrate manufacturing method according to the third embodiment can be used as an end surface processing method suitable for a glass substrate for a magnetic recording disk and an optical magnetic recording disk, as well as an electronic optical disk substrate such as an optical disk which dislikes abnormal protrusions and fine flaws, in addition to a magnetic recording disk.

The sheet glass used in the third embodiment may be shaped using a pressing method.

Next, the magnetic recording disk manufacturing method according to the third embodiment will be explained below.

In the magnetic recording disk manufacturing method according to the third embodiment, a magnetic layer is formed at least on a magnetic recording disk glass substrate obtained using the magnetic recording disk glass substrate manufacturing method.

According to the third embodiment, using a glass substrate having a surface with no abnormal protrusions and no minute flaws leads to a high-quality magnetic recording disk. That is, where a magnetic recording disk is formed from the glass substrate, the head crush due to abnormal protrusions does not occur because such a glass substrate and its surface is much better than that of a conventional one. Moreover, a defect due to a flaw formed in a film such as a magnetic layer does not cause an error.

The magnetic recording medium is usually manufactured by sequentially laminating an underlayer, a magnetic layer, a protection layer, and a lubricant on the magnetic recording disk glass substrate. The underlayer, the magnetic layer, the protection layer, and the lubricant layer are similar to those in the second embodiment, respectively.

THIRD EMBODIMENT

The third embodiment will be explained below in more detail by referring to the following examples.

Examples 3-1

The magnetic recording disk glass substrate manufacturing method is roughly divided into the following steps: (1) cutting and polishing step, (2) chemically strengthening step, (3) cooling step, and (4) cleaning step.

(1) Cutting and Polishing Step

First, a sheet of aluminosilicate glass is prepared by the down drawing method. The aluminosilicate glass may be used as a chemical reinforcement glass containing $SiO2$ of 63 wt %, $Al2O3$ of 14 wt %, $Li2O$ of 6 wt %, $Na2O$ of 10 wt %, and $ZrO2$ of 7 wt % as major components.

Successively, a disklike glass is cut from the sheet glass using a cutting whetstone. Next, the front surface and back surface are cut by a sand blasting operation. The center portion of the glass substrate is then perforated in a disk form. The perforated inner peripheral surface and outer peripheral surface are then polished with a whetstone to determine the outer diameter and the inner diameter while they are beveled. The front surface and back surface are then subjected to an accurate polishing step as a final polishing step. Thus, a disklike glass substrate is obtained.

(2) Chemically Strengthening Step

Next, the cut and polished glass substrate is cleaned and then chemically reinforced. The chemical reinforcement is performed by preparing a chemical reinforcement solution of a mixture of potassium nitride (60%) and sodium nitride (40%), heating the chemical reinforcement solution at 400° C., and immersing the glass substrate preheated at 300° C. for 3 hours. In order to chemically reinforce the whole surface of the glass substrate, the immersion is made with the ends of plural glass substrates contained and held in a holder.

Thus, the glass substrate is reinforced by immersing the glass substrate into a chemical reinforcement solution and replacing the lithium ions and sodium ions by sodium ions and potassium ions in a chemical reinforcement potassium.

The thickness of a compressed stress layer formed on the surface layer of a glass substrate is about 100 to 200 $\mu$m.

(3) Cooling Step

The chemically reinforced glass substrate is gradually cooled in first and second annealing chambers. First, the glass substrate is pulled up from the chemical reinforcement solution, transferred into the first annealing chamber at 300° C., and kept for 10 minutes in the first annealing chamber to anneal to 300° C. Next, the glass substrate is transferred from the first annealing chamber and to the second annealing chamber heated at 200° C. to anneal it from 300° C. to 200° C.

This two-step annealing treatment can eliminate damage to the glass substrate due to thermal distortion. Next, the rapidly cooled glass substrate is immersed into a water bath of 20° C. and maintained for 20 minutes.

(4) Cleaning Step

The glass substrate, after the cooling step, is immersed into a sulfuric acid heated at about 40° C. and then cleaned under ultrasonic waves.

The magnetic recording disk glass substrate fabricated through the above-described step is then subjected to a visual inspection, with the surface irradiated at 150,000 lux with a halogen lamp. No foreign matter causing possible problems was found.

(5) Magnetic Recording Disk Manufacturing Step

A magnetic recording disk is obtained by sequentially forming a Cr underlayer, a CrMo underground layer, a CoPtCr magnetic layer, and a C protection layer on both surfaces of the magnetic recording disk glass obtained in the above-described step, using an in-line sputtering apparatus.

The magnetic recording disk obtained was subjected to a gliding test. Neither a hit (meaning that a head grazes protrusions on the surface of a magnetic recording disk) nor a crush (meaning that a head collides with protrusions on the surface of a magnetic recording disk) were observed. It was confirmed that no defects in a film such as a magnetic layer were observed.

Examples 3-2 and 3-3

This is similar to example 3-1, except that a soda-lime glass (example 3-2) and a soda-aluminosilicate glass (example 3-3) are used instead of an aluminosilicate glass. Thus, a magnetic recording disk glass and a magnetic recording disk can be obtained.

As a result, the depth of the compressed stress layer is shallow. However, there is no problem in practical use.

Example 3-4

An underlayer of Al (50 angstroms thick)/Cr (1000 angstroms) /CrMo (100 angstroms), a magnetic layer of CoPtCr (120 angstroms) /CrMo (50 angstroms) /CoPtCr (120 angstroms), and a Cr (50 angstroms) protection layer are formed on both surfaces of the magnetic recording disk glass substrate obtained in example 3-1, using an in-line sputtering apparatus.

The above-described substrate is immersed into an organic silicon compound solution (being a mixed solution of water, IPA, and tetraethoxysilande) dispersed with silica fine particles (of a particle size of 100 angstroms), and then sintered so that a SiO2 protection layer is formed. The protection layer is then dipped into a lubricant of perfluoro polyether to form a lubricant layer. Thus, a MR magnetic head is obtained.

The magnetic recording disk obtained was subjected to a gliding test. However, no hit or clash was observed. It was confirmed that there is no defect in a film such as a magnetic layer.

Example 3-5

This process is similar to example 5, except that the underlayer is formed of Al/Cr/Cr and the magnetic layer is formed of CoNiCrTa. Thus, a magnetic recording disk for a thin-film head was obtained. As to the magnetic recording disk, a result similar to that in example 2-5 was confirmed.

Example 3-6

This is similar to example 3-1, except that the chemical reinforcement solution is heated to 500° C. and the glass substrate preheated at 350° C. is chemically reinforced.

As to the magnetic recording disk, a result similar to that in example 3-1 was confirmed.

Comparison example in the third embodiment

This is similar to example 3-1, except that the completely annealed glass substrate is naturally cooled, without rapidly cooling. Thus, a magnetic recording disk glass substrate and a magnetic recording disk were obtained.

Like example 3-1, a visual inspection was made to the magnetic recording disk glass substrate. As a result, it was observed that the surface has about 10 to 100 foreign matters.

The magnetic recording disks thus obtained was subjected to a gliding test. Hits and crushes were observed to about 20% of the magnetic recording disks tested.

The present embodiment has been described with reference to preferred example. The third embodiment should not however be limited only to the above-described examples.

For example, a commercially available surface-active agent and a cleaning agent (for example including alkali cleaning agents) may be used in the cleaning step, instead of a neutral cleaning agent. Moreover, as an abrasive agent, cerium oxide (CeO2), colloidal silica (SiO2), alumina (y-A1203), iron oxide red (Fe203), chromium oxide (Cr203), zirconium oxide (ZrO2), titanium oxide (TiO2), and the like may be used. A material of suede velour may be used as a soft polisher, and hard velour, urethane foam, pitch-sintered suede, and the like may be used as a hard polisher.

As described above, with the manufacturing method for the glass substrate for an information recording disk of the second embodiment, since the deposited molten salt adhered on a glass substrate can be easily removed by cleaning, a magnetic recording disk glass substrate with high flatness and no abnormal protrusions can be manufactured.

Since the molten salt deposited between the glass substrate end surface and the holding member is brittle, the glass substrate can be taken out of the holding member without any breaking of the end surface thereof.

Moreover, since a minute surface flaw or mark causes breakage in the rapid cooling process, a defective product can be easily discriminated.

Furthermore, according to the present invention of the third embodiment, since a magnetic recording disk glass substrate with no abnormal protrusions and no minute flaws on the surface thereof is used, a high-quality magnetic recording disk with fewer defect due to abnormal protrusions and minute flaws can be manufactured at a high yield.

Next, the information recording glass manufacturing method and magnetic recording disk manufacturing method according to the fourth embodiment will be explained below in detail.

In the magnetic recording disk glass substrate manufacturing method according to the fourth embodiment, the glass substrate prepared according to the first embodiment is reinforce by first immersing it into a heated chemical reinforcement solution and then exchanging ions formed on the glass substrate surface with ions in the chemical reinforcement solution.

As the ion exchanging method, preferably a low-temperature ion exchanging method is used for the same reason as in the third embodiment.

The fourth embodiment is equivalent to the third embodiment in the contents and conditions of the chemical reinforcement solution, heating temperature, immersing period, thickness of the compressed stress layer formed on a glass substrate layer, and the pretreatment of immersing a glass substrate into a molten salt.

In the chemical reinforcement step according to the fourth embodiment, preferably the glass substrate, which end surface is held, is chemically reinforced to chemically reinforce the whole glass substrate.

Similar to the third embodiment, after the chemical reinforcement operation in the fourth embodiment, preferably the glass substrate is pulled up from the chemical reinforcement solution and then annealed to a predetermined temperature to suppress the thermal distortion occurrence. This annealing treatment prevents the glass substrate from damage from thermal distortion.

In the fourth embodiment, the glass substrate is annealed at the same rate as in the third embodiment. After the annealing step, it is preferable to quickly cool the glass substrate at the rate shown in the third embodiment to prevent the molten salt deposited on the glass substrate surface from being recrystallized. When the glass substrate is quickly cooled, the deposited molten salt becomes brittle so that the cleaning effect of an acid cleaning (to be described later) can be improved.

The rapid cooling glass substrate is treated under the same condition (on temperature and hour) using the refrigerant carrier.

In the fourth embodiment, the deposited molten salt adhered to the glass substrate is removed by cleaning the surface thereof after the cooling step.

The cleaning is made by immersing the glass substrate into a cleaning agent containing a heated acid such as sulfur containing a heated acid such as sulfuric acid, phosphoric acid, nitric acid, fluoric acid, or hydrochloric, a mixed acid of the above-listed acids, or one of the above-listed acids plus a salt thereof (such as ammonium fluoride or potassium nitride). In this case, the glass substrate may be cleaned under ultrasonic waves.

Of these cleaning agents, preferably a cleaning agent containing sulfuric acid and/or phosphoric acid is selected, in the view of the cleaning effect to the deposited molten salt. In this case, the cleaning effect is further improved by cleaning with the reaction heat of the cleaning agent containing sulfuric acid and/or phosphoric acid plus hydrogen peroxide.

The acid cleaning may be carried out by sequentially immersing the glass substrate into two or more of the same or different acid cleaning baths.

The concentration of acid is determined in view of the desired cleaning effect. The optimum concentration depends on the acid used. For example, the concentration of sulfuric acid is preferably 1 to 20 wt % or more preferably 2 to 10 wt %.

The heating temperature of the acid is preferably 40 to 100° C., or more preferably 40 to 70° C. The acid cleaning period is preferably 0.5 to 5 minutes, or more preferably 1 to 3 minutes.

After the acid cleaning, a well-known cleaning treatment including a commercially available cleaning agent (such as a neutral cleaning agent, surface-active agent, or alkaline cleaning agent), a scrubbing cleaning, a pure-water cleaning, a solvent cleaning, a solvent steam drying, a centrifugal drying or the like may be carried out. Heating and ultrasonic wave application may be performed in each cleaning step.

The ultrasonic waves may be generated by a multi-frequency type generator which oscillates over a frequency range, or a fixed-frequency type generator which oscillates at a fixed frequency. Since the lower frequency leads to higher cleaning effect by may damage a largely glass substrate, the frequency must be determined in view of the desired effect.

The steam drying does not produce a stain due to drying, because of its quick drying rate. As the solvent used in the steam drying process iso-propyl alcohol, Freon (trademark), acetone, methanol, ethanol, and the like may be used.

The glass substrate is not limited to an ion exchangeable glass substrate. The size, thickness, or the like of the glass substrate is also not particularly limited.

As the material of the glass substrate, for example, aluminosilicate glass, soda-lime glass, soda-aluminosilicate glass, aluminoborsilicate glass, borosilicate glass, quartz glass, chain silicate glass, or the like may be used. Particularly, the aluminosilicate glass is preferred because it is relatively immune to the acid cleaning and has excellent shock resistance and vibration resistance.

The aluminosilicate glass, or an aluminosilicate glass containing the components shown in the second embodiment, which has been chemically strengthened, has excellent heat resistance, and does not deposit large amounts of Na under high temperatures, and provides good flatness and excellent Knoop hardness.

The magnetic recording disk glass substrate manufacturing method according to the fourth embodiment can be applied to the method of cleaning glass substrates used for magnetic recording disks and optical disks, as well as electrical optical disk substrates used for optical disks which dislike abnormal protrusions and minute flaws.

The sheet glass used in the fourth embodiment may be shaped using a pressing method.

Next, the magnetic recording disk manufacturing method according to the fourth embodiment will be described below.

In the magnetic recording disk manufacturing method according to the fourth embodiment, a magnetic layer is formed at least on the magnetic recording disk glass substrate obtained through the above-mentioned magnetic recording disk glass substrate manufacturing method.

In the fourth embodiment, since a glass substrate with a surface having no molten salt residue and no minute flaws is used, a high-quality magnetic recording disk is obtained. That is, since the glass substrate's surface condition is much better than the surface of a conventional one, a head crush due to molten salt residue does not occur to the completed magnetic recoding disk. Hence, the case where the flaw in a film such as a magnetic layer causes an error does not occur.

The magnetic recording medium is usually formed by sequentially laminating an underlayer, a magnetic layer, a protection layer, and a lubricant layer on the magnetic recoding disk glass substrate. The underlayer, protection layer, and lubricant layer are in content similar to that shown in the second embodiment.

FOURTH EMBODIMENT

The present invention will be further described below according to the following examples.

Example 1

The magnetic recording disk glass substrate manufacturing method is roughly divided into the following step: (1) cutting and polishing step, (2) chemically strengthening step, (3) cooling step, and (4) cleaning step.

(1) Cutting and Polishing Step

First, a sheet of aluminosilicate glass is prepared by the down drawing method. As the aluminosilicate glass, a chemical reinforcement glass containing $SiO_2$ of 62 wt %, $Al_2O_3$ of 15 wt %, $Li_2O$ of 10 wt %, $Na_2O$ of 10 wt %, and $ZrO_2$ of 2 wt % as major components may be used.

Successively, a disklike glass is cut out of a sheet glass using a cutting whetstone. Next, the front surface and back surface are scraped by a sand blasting operation. The center portion of a glass substrate is perforated in a disk form. The perforated inner peripheral surface and outer peripheral surface are polished with a whetstone to determine the outer diameter and the inner diameter while they are beveled. The front surface and back surface are subjected to an accurate polishing step as a final polishing step. Thus, a disklike glass substrate is obtained.

(2) Chemical Strengthening Step

Next, the cut and polished glass substrate is cleaned and then chemically reinforced. The chemical reinforcement is performed by preparing a chemical reinforcement solution of a mixture of potassium nitride (60%) and sodium nitride (40%), heating the chemical reinforcement solution at 400° C., and immersing the glass substrate which has been preheated at 300° C. for 3 hours. In order to chemically reinforce the whole surface of the glass substrate, the immersion is made with the ends of plural glass substrates contained and held in a holder.

Thus, the glass substrate is reinforced by immersing the glass substrate into a chemical reinforcement solution and thereby replacing the lithium ions and sodium ions by sodium ions and potassium ions in a chemical reinforcement potassium.

The thickness o a compressed stress layer formed in the surface layer of a glass substrate is about 100 to 200 μm.

(3) Cooling step

The chemically reinforced glass substrate is gradually cooled in first and second annealing chambers. First, the glass substrate is pulled up from the chemical reinforcement solution, transferred into the first annealing chamber at 300° C., and kept for 10 minutes in the first annealing chamber to anneal to 300° C. Next, the glass substrate is transferred from the first annealing chamber to the second annealing chamber heated at 200° C. to anneal it from 300° C. to 200° C.

This two-step annealing treatment can eliminate damage to the glass substrate due to thermal distortion. Next, the glass substrate rapidly cooled is immersed into a water bath of 20° C. and then maintained for 20 minutes.

(4) Cleaning Step

After being completely subjected to the cooling step, the glass substrate is immersed into a sulfuric acid of a concentration of 8 wt % heated at about 65° C. for two minutes and then subjected to an acid cleaning treatment while ultrasonic waves (of 40 kHz) are applied. Thus, the deposited molten salt is chiefly removed.

Next, the glass substrate is cleaned by sequentially immersing it into a neutral cleaning bath, a neutral cleaning bath, a pure water bath, a pure water bath, an IPA (isopropyl alcohol), and an IPA (steam drying) bath. In this case, ultrasonic waves (of 40 kHz) are applied in each cleaning bath.

The magnetic recording disk glass substrate fabricated through the above-described step was subjected to a visual inspection, with the surface irradiated at 150,000 lux with a halogen lamp. At maximum, only 5 foreign matters were found.

(5) Magnetic Recording Disk Manufacturing Step

A magnetic recording disk is obtained by sequentially forming a Cr underlayer, a CrMo underlayer, a CoPtCr magnetic layer, and a C protection layer on both surfaces on the magnetic recording disk glass obtained in the above-described step, using an in-line sputtering apparatus.

The magnetic recording disk obtained was subjected to a gliding test. Neither a hit (meaning that a head grazes protrusions on the surface of a magnetic recording disk) nor a crush (meaning that a head collides protrusions on the surface of a magnetic recording disk) were observed. It was confirmed that no defects in a film such as a magnetic layer were observed.

Example 4-2

This is similar to example 1, except that an acid cleaning is carried out by immersing a glass substrate into a phosphoric acid of 10 wt % concentration heated to about 40° C. for 2 minutes, instead of the sulfuric acid, under the application of ultrasonic waves (of 32 kHz). Thus, a magnetic recording disk glass substrate and a magnetic recording disk were obtained. However, as a result, a relatively small effect was obtained, compared with the sulfuric acid cleaning.

Examples 4-3 and 4-4

This is similar to examples 1 and 2, except that a hydrogen peroxide of a concentration of 35 wt % is added to an acid. Thus, a magnetic recording disk glass substrate and a magnetic recording disk were obtained.

A cleaning effect similar to that in the examples 4-1 and 4-2 was obtained by adding the hydrogen peroxide without externally heating an acid.

Examples 4-5 and 4-6

This is similar to example 1, except that a soda-lime glass (example 5) and a soda-aluminosilicate glass (example 6) are used instead of the aluminosilicate glass. Thus, a magnetic recording disk glass substrate and a magnetic recording disk was obtained.

As a result, the compressed stress layer becomes shallow, compared with the aluminosilicate glass. However, there is no problem in practical use.

Example 4-7

An underlayer of Al (50 angstroms thick) /Cr (1000 angstroms) /CrMo (100 angstroms) a magnetic layer of CoPtCr (120 angstroms), /CrMo (50 angstroms) /CoPtCr (120 angstroms), and a Cr (50 angstroms) protection layer are formed on both surfaces of a magnetic recording disk glass substrate obtained in example 4-1, using an in-line sputtering apparatus.

The above-described substrate is immersed into an organic silicon compound solution (being a mixed solution of water, IPA, and tetraethoxysilane) dispersed with silica fine particles (of a particle size of 100 angstroms), and then sintered so that a SiO2 protection layer is formed. Moreover, the protection layer is then dipped into a lubricant of perfluoro polyether to form a lubricant layer. Thus, a MR magnetic head is obtained.

The magnetic recording disk obtained was subjected to a gliding test. However, no hit or clash was observed. It was confirmed that there is no defect in a film such as a magnetic layer.

Example 4-8

This is similar to example 4-7, except that the underlayer is formed of Al/Cr/Cr, and the magnetic layer is formed of CoNiCrTa. Thus, a magnetic recording disk for a thin-film head was obtained. As to the magnetic recording disk, a result similar to that in example 4-7 was confirmed.

Comparison Example

This is similar to example 4-1, except that the glass substrate completely annealed is naturally cooled, without rapidly cooling. Thus, a magnetic recording disk glass substrate and a magnetic recording disk were obtained.

Similar to example 4-1, a visual inspection was made to the magnetic recording disk glass substrate. As a result, it was observed that the surface had about 10 to 100 foreign matters.

The magnetic recording disks thus obtained were subjected to a gliding test. Hits (about 20%) and crushes were observed to the magnetic recording disks tested.

The present embodiment has been described with reference to preferred examples. The fourth embodiment should, however, not be limited only to the above-described example.

For example, a commercially available surface-active agent and a cleaning agent (including alkali cleaning agents) may be used in the cleaning step, instead of a neutral cleaning agent.

As described above, with the manufacturing method for the glass substrate for an information recording disk of the fourth embodiment, since a glass substrate pulled up from the chemical reinforcement solution is cleaned with an acid containing cleaning agent, the deposited molten salt can be effectively removed without damaging the glass substrate.

Furthermore, according to the present invention of the fourth embodiment, since the deposited molten salt can be completed removed and a magnetic recording disk glass substrate with no minute flaws on the surface thereof is used, a high-quality magnetic recording disk with fewer defect can be manufactured at a high yield.

We claim:

1. A manufacturing method for a glass substrate for an information recording disk comprising the steps of:

immersing said glass substrate in a heated chemical reinforcement solution including a molten salt and exchanging ions on the surface portion of said glass substrate with ions in said chemical reinforcement solution to chemically strengthen said glass substrate;

removing said substrate from said chemical reinforcement solution and then annealing said substrate to a temperature higher than the crystallization temperature of said molten salt;

rapidly cooling said glass substrate at a rate at which crystallization of said molten salt deposited on the surface of said glass substrate is prevented; and then cleaning the surface portion of said substrate.

2. The manufacturing method of claim 1 wherein said chemical reinforcement solution consists of a molten salt selected from the group comprising potassium nitride (KNO3), sodium nitride (NaNO3), potassium carbonate (K2CO3), a molten salt of a combination of the above-listed salt N3+NaNO3, KNO3+K2CO3, and a molten salt made of the above-listed salts with a salt of $Cu^+$, $Ag^+$, $Rb^+$, $Cs^+$.

3. The manufacturing method of claim 1, wherein said rate of rapidly cooling said glass substrate is 1600° C./min. to 200° C./min.

4. The manufacturing method of claim 1, wherein said heated chemical reinforcement solution is at a temperature between 350° C. to 650° C.; wherein said step of annealing is to a temperature between 300° C. to 350° C.; and wherein said step of rapidly cooling said glass substrate includes rapidly cooling said glass substrate by contacting said glass substrate with a cool medium.

5. The manufacturing method of claim 1, wherein said glass substrate comprises an aluminosilicate glass, said aluminosilicate glass being a chemical reinforced glass containing SiO2 of 62 to 75 wt %, Al2O3 of 5 to 15 wt %, Li2O of 4 to 10 wt %, Na2O of 4 to 12 wt %, and ZrO2 of 5.5 to 1.5 wt % as major components, Na2O/ZrO2 having a weight ratio of 0.5 to 2.0, and Al2O3/ZrO2 having a weight ratio of 0.4 to 2.5.

6. A manufacturing method for a glass substrate for an information recording disk comprising the steps of:

immersing said glass substrate in a heated chemical reinforcement solution and exchanging ions on the surface layer of said glass substrate with ions in said chemical reinforcement solution to chemically strengthen said glass substrate; and removing said substrate from said chemical reinforcement solution and then cleaning the surface layer of said glass substrate with a cleaning agent containing acid.

7. A manufacturing method for a glass substrate for an information recording disk comprising the steps of:

chemically strengthening a glass substrate by immersing said glass substrate in a heated chemical reinforcement solution and then exchanging ions on the surface layers of said glass substrate with ions in said chemical reinforcement solution;

pulling up said substrate from said chemical reinforcement solution and annealing said substrate to a temperature higher than a temperature at which crystallization of a molten salt begins; and, rapidly cooling said substrate and then cleaning said substrate, wherein said rapidly cooling step is performed so as to weaken and remove said molten salt deposited on the surface of said glass substrate by said cleaning step.

* * * * *